W. H. RUSSELL.
THRUST BEARING.
APPLICATION FILED DEC. 26, 1908.

1,024,457.

Patented Apr. 23, 1912.

WITNESSES

INVENTOR
WILLIAM H RUSSELL

UNITED STATES PATENT OFFICE.

WILLIAM H. RUSSELL, OF NEWCASTLE, NEW BRUNSWICK, CANADA.

THRUST-BEARING.

1,024,457.  Specification of Letters Patent.  Patented Apr. 23, 1912.

Application filed December 26, 1908. Serial No. 469,255.

*To all whom it may concern:*

Be it known that I, WILLIAM H. RUSSELL, of the town of Newcastle, in the Province of New Brunswick and Dominion of Canada, have invented certain new and useful Improvements in Thrust-Bearings, of which the following is a full, clear, and exact description.

My invention relates to improvements in combined roller and thrust bearings and the object is to provide a simple and inexpensive bearing which will reduce all friction to a minimum.

This invention is designed as an improvement on the device patented to me in the United States #823,083, of June 12, 1906.

The particular object of this invention is to provide a bearing in which the end thrust is taken up more effectively than heretofore and in which the number of separate parts used in my former invention is greatly reduced.

To accomplish these objects, I provide a series of cylindrical rollers held at their ends between a pair of rings by means of balls. A second pair of rings, larger than the first and concentric therewith, are provided. A series of frusto-conical rollers are secured between each pair of rings by means of balls at the ends thereof. A sleeve surrounds the cylindrical rollers and carries a pair of adjustable thrust collars engaging said frusto-conical rollers while a second pair of thrust collars is carried by the shaft or axle on which the bearing is mounted.

Figure 1:
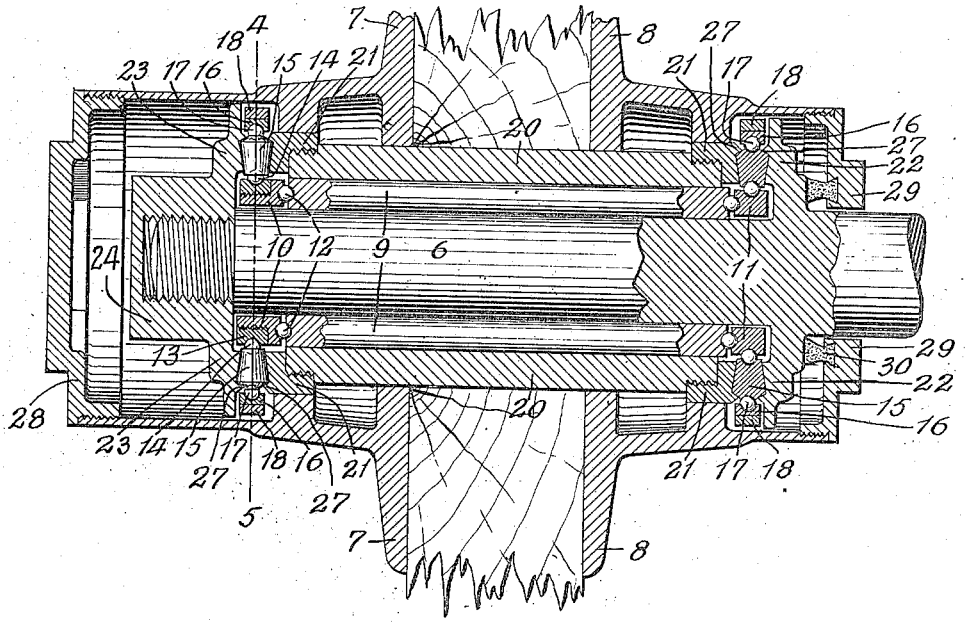
Figure 2:
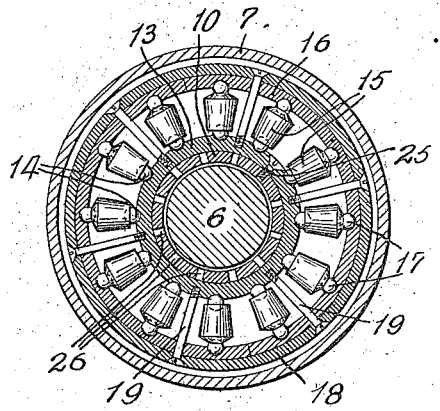

In the drawings which illustrate my invention:—Figure 1 is a section through the hub of a wheel showing the bearing in place. Fig. 2 is a cross-sectional view on the line 4—5 of Fig. 1.

In the above defined figures, 6 designates a shaft which, in the illustration, is a vehicle axle, while 7 and 8 are the outer and inner halves respectively of the hub of a wheel mounted thereon. A series of cylindrical rollers 9 are provided surrounding the axle 6 and are secured between outer and inner rings 10 and 11, respectively, by means of balls 12 seated, one half in pockets in the rollers' ends and the other half in corresponding pockets in the rings, as is fully described in my former patent. The outer ring 10 is L-shaped in cross section and is provided with a ring 13 threaded thereto. In the outer circumference of the rings 11 and 13, are series of ball pockets containing balls 14. Frusto-conical rollers 15 are pocketed at their smaller ends and seated on the balls 14. A second pair of rings 16 are provided having pockets in which one half of the balls 17 are seated, the other half of said balls being seated in pockets in the larger ends of the rollers 15. The rings 16 are formed in two or more parts for convenience in machining the ball pockets, which parts are held together by binder rings 18. Screws 19 are passed through the rings 16 and 18 and screwed into the rings 11 or 13 as the case may be. These screws hold the rings rigidly in line and concentric with one another. A sleeve 20 surrounds the rollers 9 and is provided at its ends with adjustable thrust collars 21. A thrust collar 22 is formed integral with the inner ends of the bearing surface of the axle. A corresponding thrust collar 23 is formed on the nut 24 which screws on to the outer end of the axle.

When the bearing is placed in the hub, the outer end thrust bearing is adjusted by means of the ring 13 which carries the bearing and which is screwed to the ring 10, so that the outer and inner thrust bearings travel smoothly and easily on the thrust collars 21. When the desired adjustment is obtained, the rings 10 and 13 are locked together by means of a screw 25 which passes through the ring 13 and may be screwed into any one of a plurality of holes 26 in the ring 10. The wheel is then placed on the axle and adjusted by means of the nut 24 so that the thrust bearings run easily between the thrust collars 22 and 23. When the thrust comes on the frusto-conical rollers 15, the stress will tend to force them radially outward owing to their form thus bringing a great bursting stress on the rings, binder rings 18, screws 19 and through these screws, on the rings 11 and 13. To relieve this stress, I bevel the edges of the larger ends of all the rollers 15 and provide the thrust collars 21, 22, and 23 with integral projecting annular rings 27 which engage the bevel on the rollers' ends and take up the outer thrust of the rollers, thus relieving the stress on the rings carrying the rollers. When the bearing is applied to a vehicle axle, the hub of the wheel is provided with dust caps 28 and 29. the inner of which, 29, carries a dust brush 30, adapted to rub on the thrust collar 22 and prevent the passage of dust and grit to the bearing.

The operation of the device will be readily understood from the foregoing description and will require no further explanation.

The advantages of the device are obvious. There are no loose parts liable to become lost. The thrust, instead of being distributed among the points where the balls touch the rings as in my former patent, is distributed over the length of the rollers, thus giving a larger bearing surface and reducing the friction to a minimum.

Having thus described my invention, what I claim is:—

1. A roller bearing comprising in combination with a shaft, a pair of rings, parallel rollers between said rings, balls pivoting said rollers between said rings, a second pair of rings concentric with said first pair, radial frusto-conical rollers between said concentric rings, balls pivoting said frusto-conical rollers between said concentric rings, a sleeve surrounding said parallel rollers, thrust collars on the ends of said sleeve engaging said frusto-conical rollers, and a second pair of thrust collars carried by said shaft and engaging said frusto-conical rollers.

2. A roller bearing comprising in combination with a shaft, a pair of rings, having pockets in the adjacent sides thereof, parallel rollers surrounding said shaft, having pockets in the ends thereof, balls seated one half in the pockets in said rings and one half in the pockets in said rollers, an adjusting ring screwed to the second of said rings, sectional outer rings concentric with said first ring, and adjusting ring, frusto-conical rollers, binder rings securing the sections of said sectional rings together, means for maintaining said rings rigid and concentric, locking means for said adjusting ring, a sleeve surrounding said parallel rollers, adjustable thrust collars on the ends of said sleeve engaging said frusto-conical rollers, a thrust collar fixed to said shaft and engaging said frusto-conical rollers, and annular collars.

In witness whereof I have hereunto set my hand in the presence of two witnesses.

WILLIAM H. RUSSELL.

Witnesses:
C. W. TAYLOR,
E. R. MCKENZIE.